United States Patent
Cao et al.

(10) Patent No.: US 9,612,865 B2
(45) Date of Patent: Apr. 4, 2017

(54) MANAGED SERVICES COORDINATOR

(71) Applicant: International Business Machines Corporation, Armonk, NY (US)

(72) Inventors: Bin Cao, Rochester, MN (US); Daniel L. Hiebert, Pine Island, MN (US); Brian R. Muras, Otsego, MN (US); Tanveer Zubair, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/739,024

(22) Filed: Jun. 15, 2015

(65) Prior Publication Data
US 2016/0364263 A1 Dec. 15, 2016

(51) Int. Cl.
G06F 9/46 (2006.01)
G06F 9/48 (2006.01)
G06F 9/50 (2006.01)

(52) U.S. Cl.
CPC ......... *G06F 9/4818* (2013.01); *G06F 9/4881* (2013.01); *G06F 9/50* (2013.01); *G06F 9/5011* (2013.01)

(58) Field of Classification Search
CPC .... G06F 9/4818; G06F 9/4881; G06F 9/5011; G06F 9/50
See application file for complete search history.

(56) References Cited

U.S. PATENT DOCUMENTS

| | | | |
|---|---|---|---|
| 7,058,949 B1 * | 6/2006 | Willen | G06F 9/4881 718/102 |
| 8,756,599 B2 | 6/2014 | Devarakonda et al. | |
| 9,286,120 B2 * | 3/2016 | Magee | G06F 9/50 |
| 2010/0115521 A1 * | 5/2010 | Morisada | G06F 9/5072 718/102 |
| 2014/0304387 A1 | 10/2014 | Bansal et al. | |
| 2015/0358392 A1 * | 12/2015 | Ramalingam | H04L 67/10 709/203 |

OTHER PUBLICATIONS

Anonymous, "A smart patch detecting and advising method in cloud," IP.Com Prior Art Database Technical Disclosure, IP.Com No. 000227698, May 13, 2013, pp. 1-3. http://null/IPCOM/000227698.

(Continued)

*Primary Examiner* — Camquy Truong
(74) *Attorney, Agent, or Firm* — Heather S. Chatterton

(57) ABSTRACT

A method is provided for applying tasks. The method can include receiving a plurality of tasks for a plurality of applications, an application of the plurality of applications is hosted by a computing environment utilizing a monitoring agent, and a task is performed for an operation of the application during a first period of time. The method can also include determining a first resource type and a first resource amount from the computing environment for performing the task. The method can also include grouping the plurality of tasks into a set of tasks based on the first resource type, at least two tasks from the set of tasks being performable in parallel during the first period of time. The method can also include determining whether the first resource amount of the first resource type is present in the computing environment during the first period of time.

14 Claims, 10 Drawing Sheets

(56) References Cited

OTHER PUBLICATIONS

Buyya et al., "InterCloud: Utility-Oriented Federation of Cloud Computing Environments for Scaling of Application Services," ICA3PP'10: Proceedings of the 10th International Conference on Algorithms and Architectures for Parallel Processing—vol. Part 1, pp. 1-20, Springer-Verlag Berlin, Heidelberg, © 2010.

Ciano, G., "How to easily extend your IBM SmartCloud Orchestrator infrastructure," Thoughts on Cloud: Cloud computing conversations led by IBMers, May 12, 2014, pp. 1-3, © 2014 IBM Corporation. http://archive.thoughtsoncloud.com/2014/05/easily-extend-ibm-smartcloud-orchestrator-infrastructure/.

HP, "Operations Orchestration (HP 00)," IT Process Automation Software, © 2015 Hewlett-Packard Development Company, L.P., pp. 1-3. http://www8.hp.com/us/en/software-solutions/operations-orchestration-it-process-automation/.

IBM, "Our fully managed, security, rich, production, ready cloud environment for enterprise applications," Marketplace: IBM Cloud Managed Services, pp. 1-3. http://www.ibm.com/marketplace/cloud/managed-cloud-environment/us/en-us.

MELL et al., "The NIST Definition of Cloud Computing: Recommendations of the National Institute of Standards and Technology," NIST Special Publication 800-145, Sep. 2011, pp. 1-7, National Institute of Standards and Technology, U.S. Department of Commerce, Gaithersburg, MD.

Toombs et al., "Magic Quadrant for Cloud-Enabled Managed Hosting, North America," Gartner Report, Jul. 15, 2014, pp. 1-12, © 2014 Gartner, Inc. http://www.gartner.com/technology/reprints.do?id=1-1XH78YH&ct=140715&st=sb.

Unknown, "What are Managed Services & How They Help Small Business," Networks Unlimited.com blog, Apr. 4, 2014, pp. 1-6, © Networks Unlimited, Inc. http://networksunlimited.com/blog/2014/4/4/what-are-managed-services-how-they-help-small-business.

Cao et al., "Managed Services Coordinator," U.S. Appl. No. 14/869,428, filed Sep. 29, 2015.

List of IBM Patents or Patent Applications Treated as Related, signed Sep. 28, 2015, 2 pages.

\* cited by examiner

MANAGED SERVICES COORDINATOR

BACKGROUND

The present disclosure relates to virtual machine process management, and more specifically, to process scheduling.

Cloud Managed Services is an emerging market in the public, private, and hybrid cloud sector. Cloud managed services are interesting for both enterprise, and small and midsized businesses (SMB) information technology (IT) landscapes as a major market for business value and improvements to an entity's respective clouds. If cloud computing is about "create, delete, start, stop, and restart", then cloud managed services is everything about what happens once a virtual machine (VM) is created and started, including but not limited to, Anti-Virus, Backup, Disaster Recovery, Monitor, Health-Check, Patch, Security, and Compliance.

SUMMARY

Embodiments of the disclosure provide a method, system, and computer program product for applying tasks.

One embodiment is directed toward a method for applying tasks. The method can include receiving a plurality of tasks for a plurality of applications, an application of the plurality of applications is hosted by a computing environment utilizing a monitoring agent, and a task is performed for an operation of the application during a first period of time. The method can also include determining a first resource type and a first resource amount from the computing environment for performing the task. The method can also include grouping the plurality of tasks into a set of tasks based on the first resource type, at least two tasks from the set of tasks being performable in parallel during the first period of time. The method can also include determining whether the first resource amount of the first resource type is present in the computing environment during the first period of time. The method can also include determining, in response to the first resource amount of the first resource type not being present in the computing environment, a priority of a task in the set of tasks based on both a second resource amount present in the computing environment and one or more prioritization factors. The method can also include performing the task in the set of tasks as a function of the priority.

Another embodiment is directed toward a system for applying tasks. The system can include a processor and a memory storing a program, which, when executed on the processor, performs an operation. The system can include receiving a plurality of tasks for a plurality of applications, an application of the plurality of applications is hosted by a computing environment utilizing a monitoring agent, and a task is performed for an operation of the application during a first period of time. The system can also include determining a first resource type and a first resource amount from the computing environment for performing the task. The system can also include grouping the plurality of tasks into a set of tasks based on the first resource type, at least two tasks from the set of tasks being performable in parallel during the first period of time. The system can also include determining whether the first resource amount of the first resource type is present in the computing environment during the first period of time. The system can also include determining, in response to the first resource amount of the first resource type not being present in the computing environment, a priority of a task in the set of tasks based on both a second resource amount present in the computing environment and one or more prioritization factors. The system can also include performing the task in the set of tasks as a function of the priority.

Another embodiment is directed toward a computer program product for applying tasks comprising a computer readable storage medium having a computer readable program stored therein, wherein the computer readable program, when executed on a computing device, causes the computing device to receive a plurality of tasks for a plurality of applications, an application of the plurality of applications is hosted by a computing environment utilizing a monitoring agent, and a task is performed for an operation of the application during a first period of time. The computer readable program can also cause the computing device to determine a first resource type and a first resource amount from the computing environment for performing the task. The computer readable program can also cause the computing device to group the plurality of tasks into a set of tasks based on the first resource type, at least two tasks from the set of tasks being performable in parallel during the first period of time. The computer readable program can also cause the computing device to determine whether the first resource amount of the first resource type is present in the computing environment during the first period of time. The computer readable program can also cause the computing device to determine, in response to the first resource amount of the first resource type not being present in the computing environment, a priority of a task in the set of tasks based on both a second resource amount present in the computing environment and one or more prioritization factors. The computer readable program can also cause the computing device to perform the task in the set of tasks as a function of the priority.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
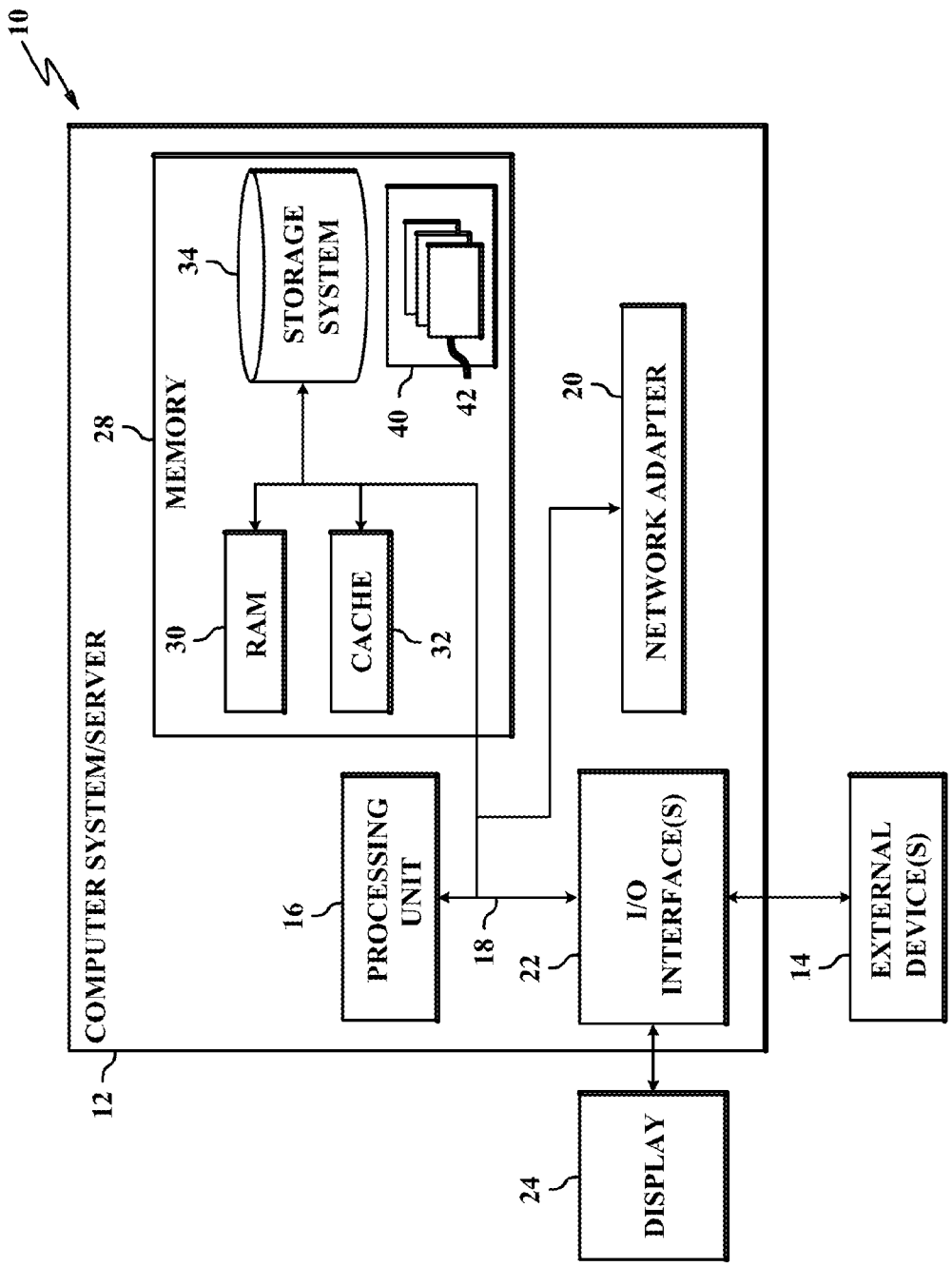
FIG. 1 depicts a cloud computing node according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to virtual machine process management, and more specifically, to process scheduling. For instance, a virtual machine (VM) may host one or more applications. An application can have one or more tasks to be performed by a hosting service for a virtual machine. Each task can require a resource from the hosting service. A cloud managed services coordinator can coordinate the tasks between the hosting service and various applications. The coordination can balance the resources within the hosting service based on the resource type. While the present disclosure is not necessarily limited to such applications, various aspects of the disclosure may be appreciated through a discussion of various examples using this context.

Cloud Managed Services (CMS) may be pre-installed on various VMs. These cloud managed services run independently with various coordination levels between each service or the cloud provider (e.g., OpenStack® owned by Openstack Foundation, vCenter™ owned by VMware, Inc., or CloudStack® owned by Apache Software Foundation). When applying cloud managed services, issues in the cloud computing environment may occur. For example, some cloud networks may have as many as 18,000 VMs running across several sites (e.g., 3,000 to 6,000 managed sites) and each managed service may be working in isolation achieving the necessary goals to ensure that the correct policies are adhered to across the cloud environment. For example, a situation may arise where a Patch update on a fixpack is concurrently performed on 18,000 VMs during a nightly backup session and, during the nightly backup, an extensive virus scan operation occurs. The situation where the virus scan and the patch update occur at the same time may cause performance degradation in the cloud computing system.

A cloud managed services coordinator can determine which cloud managed service can take priority or precedence. For example, when multiple managed services (which may also be referred to as applications) all come into contention for central processing unit (CPU), Memory, Network, or Storage resources, the cloud managed services coordinator can orchestrate between the cloud and the managed services that reside on that cloud to better coordinate activities.

A number of tasks may be associated with a managed service. The cloud managed services coordinator can be "aware" of the types of managed services residing on each VM, and can pre-determine the priority of the tasks based on the physical location of the VM. The cloud managed services coordinator can provide insight into actions that get performed across the datacenter to maximize through-put and results. For instance, the cloud managed services coordinator can communicate with managed services and communicate VM information including type of services residing on the VM.

The cloud managed services coordinator can also communicate with the Cloud Provider (i.e., a hosting service) to determine logistical location, physical host, and/or pool. Based on the communication with the managed services and the cloud provider, the cloud managed services coordinator can recommend the best policy for obtaining maximum efficiency based on CMS and the corresponding locations. In a selection example between a virus scan and patch, the cloud managed services coordinator can recommend Patch/Virus policies more expediently by rolling out fixes or scans when critical threats are encountered. For example, the cloud managed services coordinator may receive a warning from the cloud manager that two VMs were hit by a Domain Name System (DNS) hijacking virus and that the application manager intends to roll out recommend patch updates and virus definition updates and kick-off virus scans to all similar VMs.

The application may have multiple tasks to perform. One task may be CPU intensive (e.g., a virus scan) while another is Input/Output (IO) intensive (e.g., a backup). The cloud managed services coordinator can recommend to the application manager to run these two tasks in parallel versus doing two CPU intensive items at the same time (e.g., a virus scan and patch maintenance/update). The cloud managed services coordinator can learn the CPU monitoring via real-time monitoring, history of resources used by tasks, or by an admin specifying resources necessary for tasks. If the cloud managed services coordinator detects that two tasks are competing for resources, then the cloud managed services coordinator may choose to prioritize one task over the other (e.g., prioritize an urgent virus scan over nightly backup) and/or hibernate one of the tasks until the other task completes.

In various embodiments, the cloud managed services coordinator may use a pattern and/or behavior of a user to distribute and assign patch updates. The cloud managed services coordinator may also modify patches and updates based on dynamic business demand/policies (e.g., for compliance/regulation). For example, the cloud managed services coordinator can move a set of cloud infrastructure into a better adjusted region according to requirements of the business before applying all the required patches.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
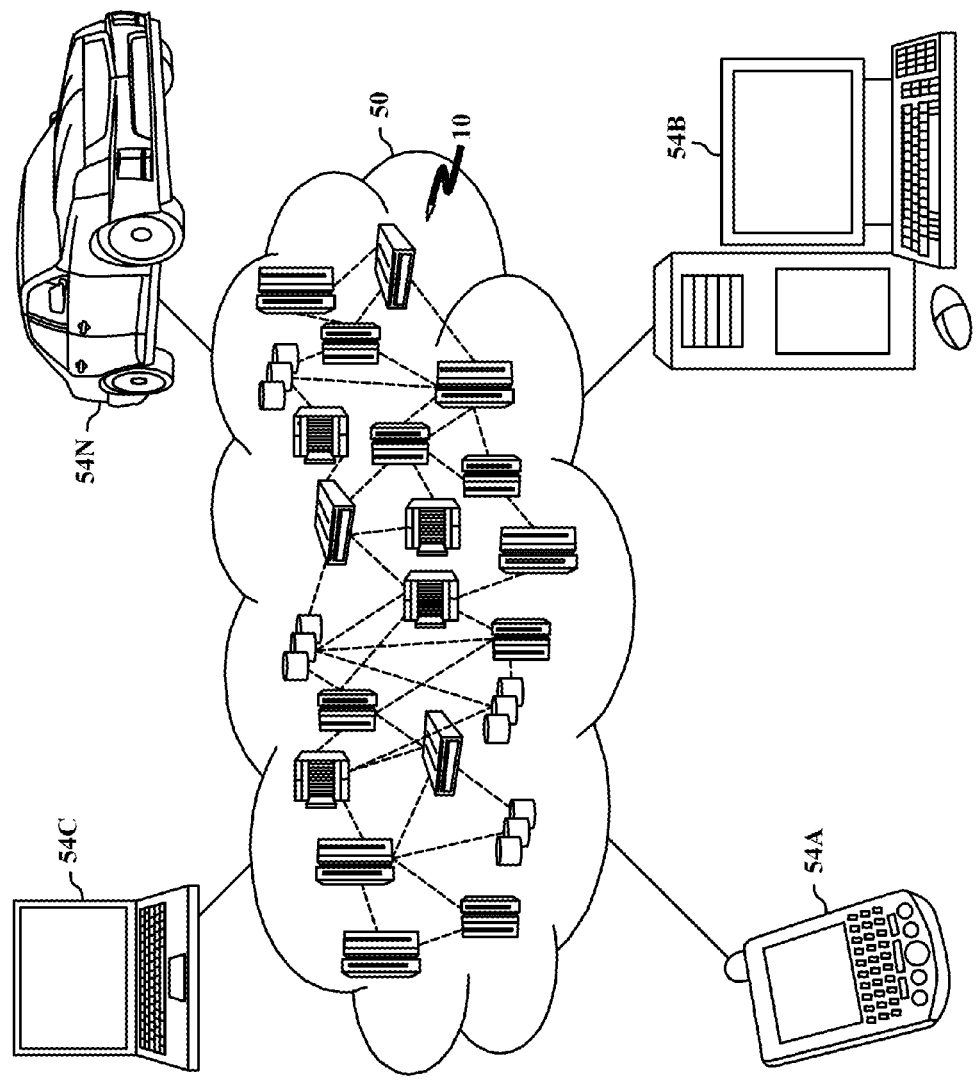
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
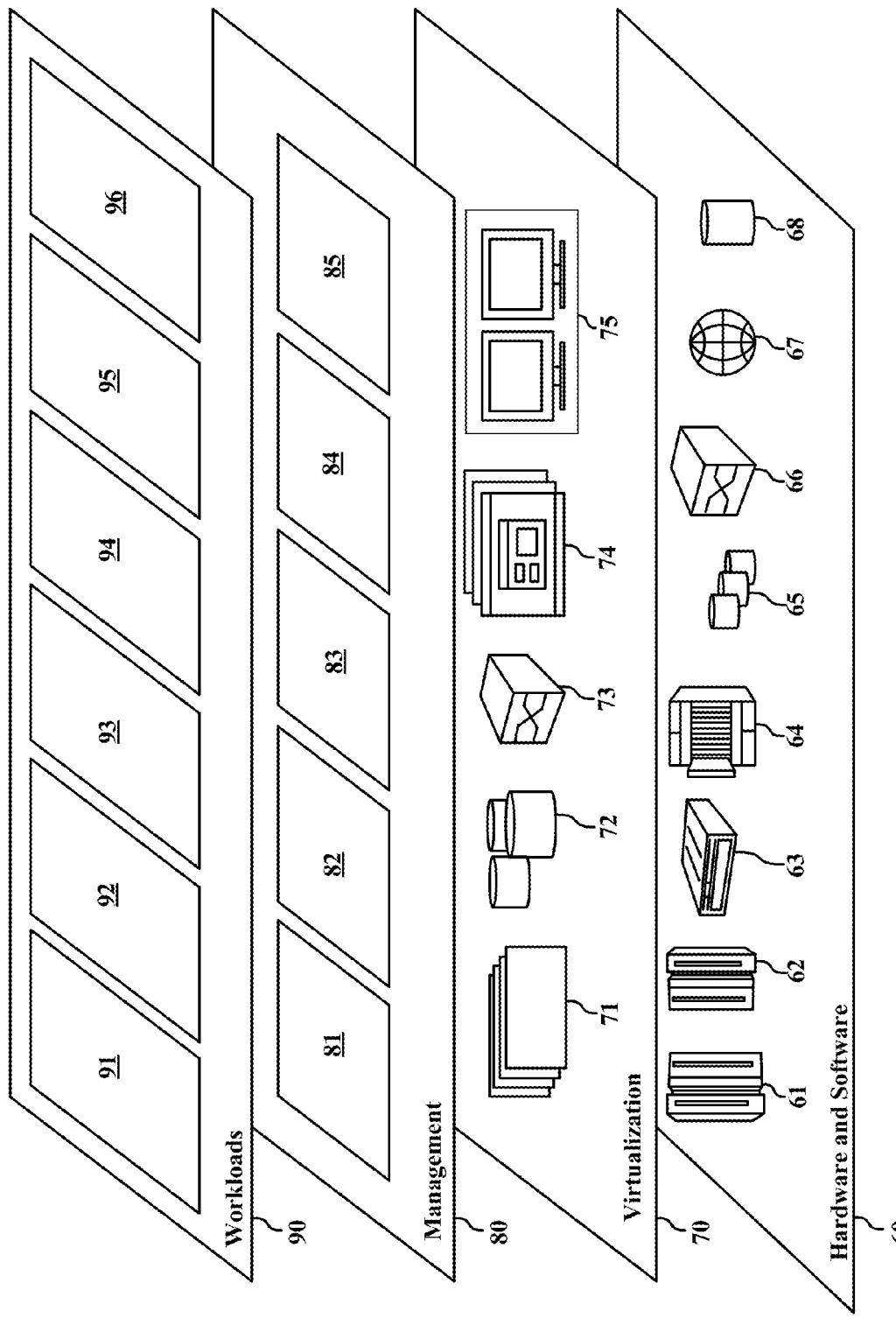
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

Figure 4:
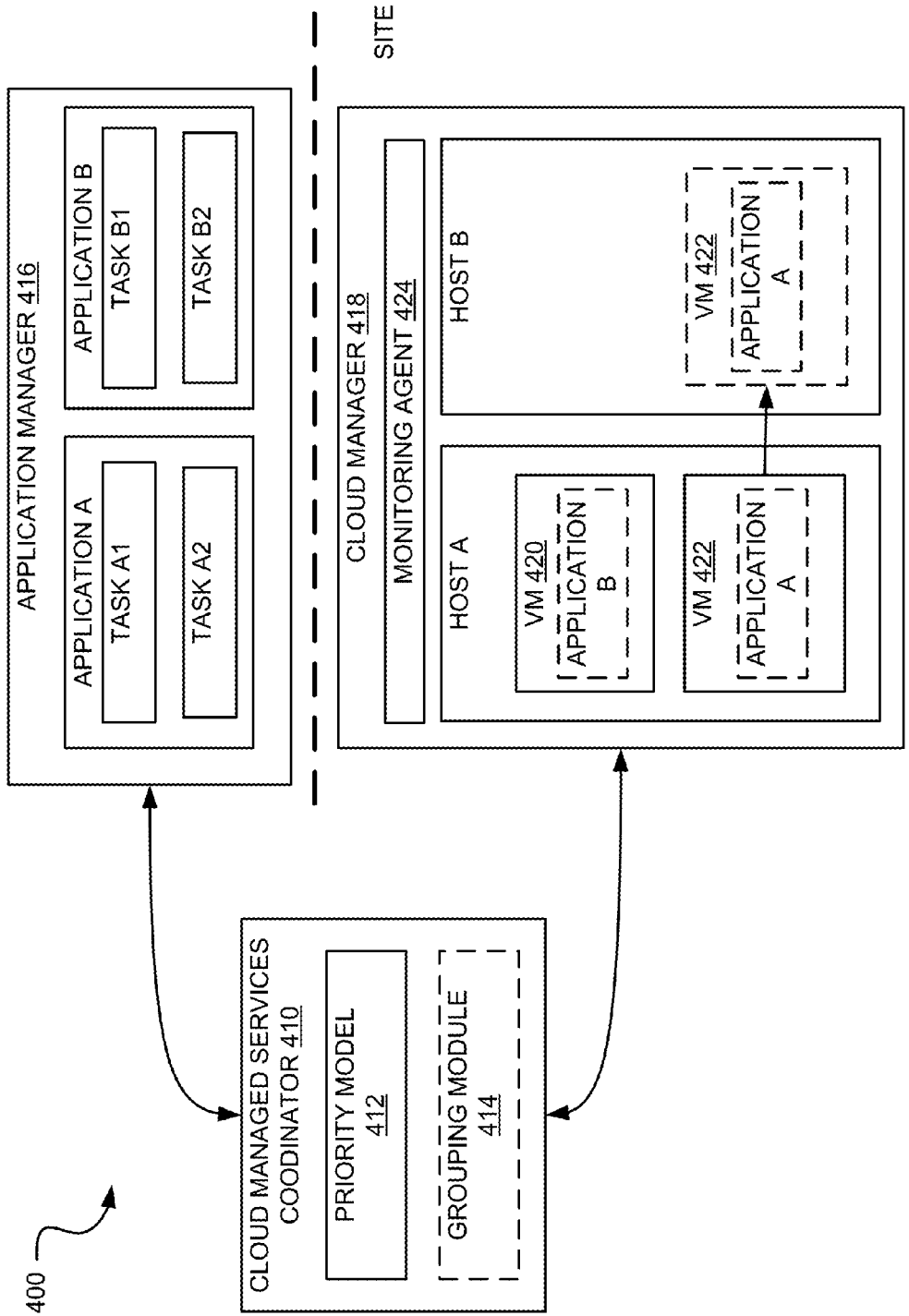
FIG. 4 illustrates a block diagram of a cloud managed services coordinator in a distributed computing environment, according to various embodiments.

FIG. 4 illustrates a block diagram of system 400 for prioritizing tasks, according to various embodiments. The system 400 can have a cloud managed services coordinator 410 that communicates between the cloud manager 418 and the application manager 416. The cloud manager 418 perform management functions (e.g., management functions 80 of FIG. 3).

The application manager 416 manages the various applications used by the cloud manager 418. For example, the application manager 416 may have an application A and application B. The application may refer to a managed service. Each application may have a number of tasks to perform. For example, application A may have task A1 and task A2. Application B may have task B1 and task B2. An application may be hosted by a hosting service (e.g., VM 420 hosts application B and VM 422 hosts application A).

The hosting service can be run from a variety of servers, including servers independent from the cloud computing environment. In various embodiments, the hosting service is the cloud computing environment with the hosts being similar to a cloud computing node.

The application manager 416 can involve applications (i.e., software as a service) and include an application programming interface (API) to interact with the various applications. The application manager 416 can process various scripts via the REST API. Various tasks can be integrated into the application manager 416. The application manager 416 can declare applications ahead of time or can manage the applications as they are uploaded.

A task is a service that is performed for an operation of the application at a particular period of time (e.g., a first period of time, or a second period of time). In various embodiments, the first period of time can be temporally before the second period of time. The task can depend on the application. For example, if Application A is a storage management application, then task A1 may be a virus scan, and task A2 may be a backup. If application B is a game, then task B1 may be a profile cleanup while task B2 may be a learning algorithm. The tasks may require different levels and types of resources from the hosting service. For example, a virus scan may be more processor intensive than the backup. The tasks may be performed at a particular period of time. For example, the tasks A1 and A2 may be performed by the hosting service at 0200 while the tasks B1 and B2 may be performed at 0300.

The cloud manager 418 may manage the resources of a cloud computing environment. The cloud manager 418 may examine resources of a VM, cluster, or pool. The cloud manager 418 can include multiple hosts or computer nodes (e.g., cloud computing nodes). The hosts are the hardware implementations that support one or more virtual machines. For example, the cloud manager 418 may allow host A to support VM 420 and VM 422. VM 420 may run application B while VM 422 may run application A. In various embodiments, the cloud manager 418 can be configured to increase or decrease resource pool sizes to scale with the demand of the applications.

The cloud manager 418 can include a monitoring agent 424. The monitoring agent 424 can determine the workload of the various hosts within the cloud computing environment. A hosting service may refer to an entity that hosts one or more application in a cloud computing environment. The hosting service may provide services to various customers (e.g., software as a service, infrastructure as a service, etc.). In various embodiments, functions of a monitoring agent 424 may also be performed by the cloud manager 418. The monitoring agent 424 can collect raw data related to CPU utilization and workload storage capacity.

The cloud managed services coordinator 410 may communicate with the application manager 416 in order to coordinate the tasks that are performed for the application on the virtual machine. In various embodiments, the cloud managed services coordinator 410 can be integrated into an application manager 416. The cloud managed services coordinator 410 can use a priority model 412 to prioritize the tasks in an application based on the resources of the VM. For example, if application A is scheduled to perform a processing intensive task A1 (e.g., a virus scan) during the same time period as application B is scheduled to perform a processing intensive task B1, then the application manager 416 can communicate this to the cloud managed services coordinator 410.

The cloud managed services coordinator 410 can determine which task has priority for processing resources using the priority model 412. Assuming that each task has equal priority, or an administrator elected to process both services in parallel, then the cloud managed services coordinator 410 can receive a resource allocation of VM 420 and VM 422. If the cloud managed services coordinator 410 determines that there are not enough processing resources to perform both task B1 and task A1 for applications B and A, then the cloud managed services coordinator 410 can instruct the cloud manager 418 to rearrange resources to accommodate the future resources. For example, the cloud manager 418 can migrate VM 422 from host A to host B in order to accommodate performing service B1 and service A1 in parallel.

In various embodiments, the cloud managed services coordinator 410 can include a grouping module 414. The grouping module 414 may be responsible for grouping various tasks in the various applications into sets of tasks. The sets of tasks can be arranged by resources committed. The resources committed can be balanced within the set of tasks such that the tasks do not use more of a particular type of resource of a hosting service during a time period than is supported by the hosting service during the time period, which can allow for parallel processing.

In various embodiments, the cloud managed services coordinator 410 can interleave backups and virus scans on various physical hosts of pools by collaborating with the cloud manager 418. For example, the cloud managed services coordinator 410 can recommend to the cloud manager 418 to migrate applications or VMs to different hosts to facilitate the backups. For example, the cloud managed services coordinator 410 may recommend to allocate 2 gigabytes more memory to a virtual machine by backing up 2 gigabytes of data temporarily to another host, then using the freed memory to perform another task. If a nightly backup has a lower priority than a patch, then the patch occurs before the nightly backup. The cloud managed services coordinator 410 can run CPU bound operations in parallel with storage. In various embodiments, running a backup in parallel with storage updates for applications on the same physical hosts may be less intrusive because only one host is occupied with IO requests. The cloud managed services coordinator 410 can also recommend to the cloud manager 418 to increase a pool size for a virtual machine.

In a standard, distributed, or clustered environment, the cloud managed services coordinator 410 metrics can be shared with the central layer (e.g., CloudEx or Central Service Mediator), to better make provisioning requests during coordinated activities. In various embodiments, a distributed model for cms coordination (many-to-many) can be used. A distributed model can allow for coordination that allows more flexibility and prioritization sorting based on various components in the cloud environment at scale. A distributed modular coordination may allow for parallel processing across platforms for patch updates. The cloud managed services coordinator 410 may also utilize advanced multi-task management that queues short and regional tasks based on abilities of the dependent components.

Figure 5A:
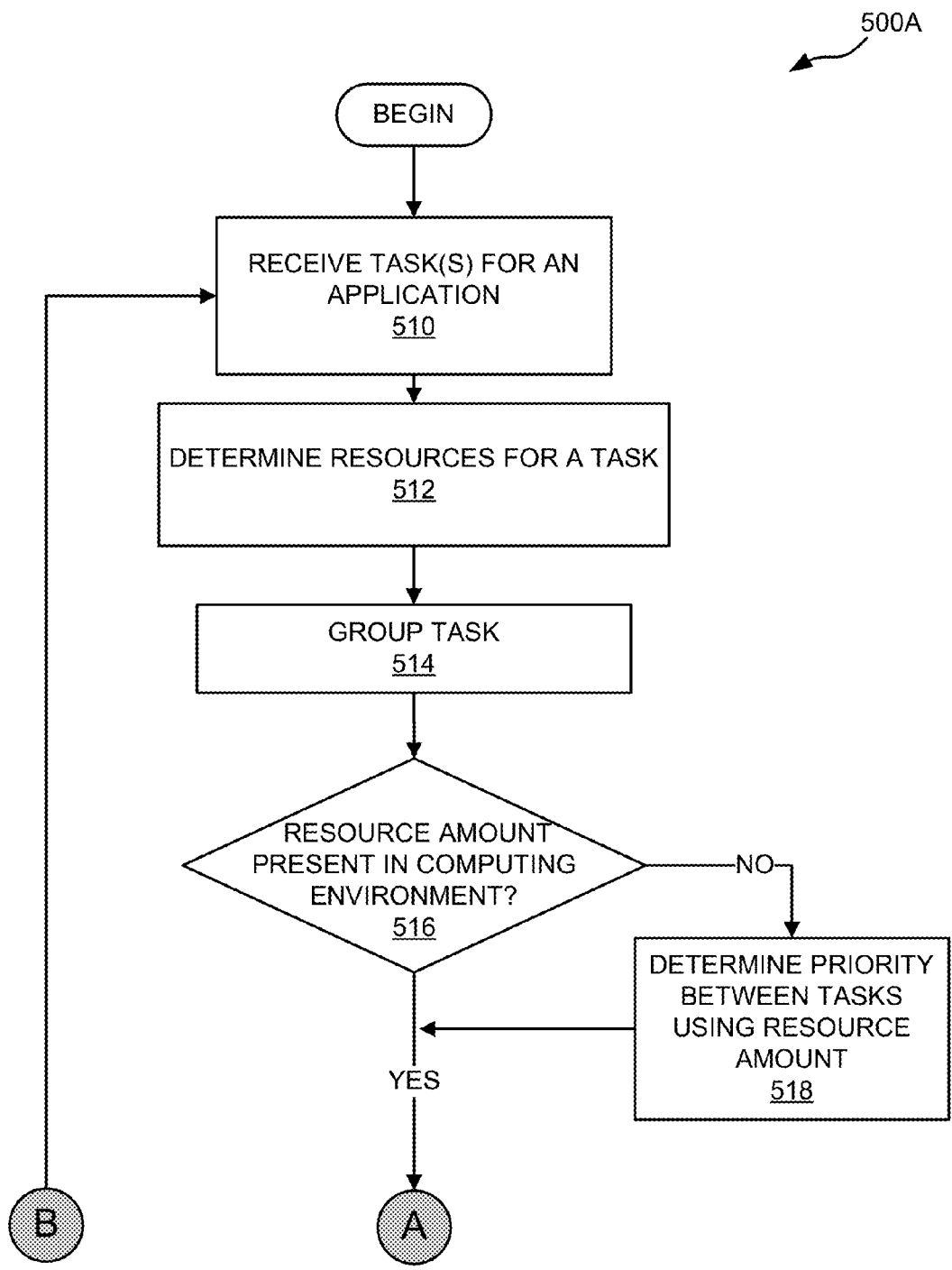
FIG. 5A illustrates a flowchart of a method 500A for rescheduling services, according to various embodiments.

FIG. 5A illustrates a flowchart of a method 500A for rescheduling services, according to various embodiments. The method 500A can be directed toward actions on the cloud managed services coordinator. For example, the cloud managed services coordinator can receive one or more tasks for an application, which can also be referred to as scheduled services. The cloud managed services coordinator can determine resources required for the tasks and prioritize the tasks if more resources are required than are available. The cloud managed services coordinator can determine if the dependencies are sufficient within the cloud computing environment and, if not, request for the cloud computing environment to shift virtual resources and/or reschedule the tasks. The method 500A can begin in operation 510.

In operation 510, the cloud managed services coordinator can receive a plurality of tasks for a plurality of applications (e.g., receiving the plurality of tasks from an application manager). An application can have one or more tasks associated with it. The type of task can depend on the application. For example, a storage application may have a virus scan task or a resetting/restart task. In various embodiments, the term scheduled service may refer to a task that the application has to perform at a future time.

In operation 512, the cloud managed services coordinator can determine resources for a task from the computing environment. In various embodiments, the cloud managed services coordinator can determine resources required from the computing environment. For example, the resources required for a virus scan may include 3 million CPU cycles/second and 20 megabytes of memory per second from the computing environment. In various embodiments, the cloud managed services coordinator can determine the resources committed by the computing environment for a task, which may be different than the resources required. For example, if the virus scan task requires 3 million CPU cycles/second and 20 megabytes of memory per second, but only 2 million CPU cycles/second and 10 megabytes of memory per second are committed by a host, then the host may not have the resources to support the task. The cloud managed services coordinator can determine both a resource type (e.g., a first resource type) (e.g., memory, processing, storage) and a resource amount (e.g., a quantity of the resource type). More than one resource amount may exist. For example, a resource type of memory may be required by the application in a first resource amount (e.g., 5 Gigabytes (GB)) and in a second resource amount (e.g., 10 GB) depending on the time. There may be more than one resource type (e.g., a first resource type and a second resource type) within a computing infrastructure. The resource type can refer to a physical hardware type of resource relating to the computing environment. For example, a resource type does not necessarily have to be tied to a particular VM. The resource type may refer to a single floating point processor which is needed by several tasks. The single floating point processor may support a plurality of VMs.

Once the task is received by the cloud managed services coordinator, the cloud managed services coordinator can estimate the amount of resources required for the task. For example, the cloud managed services coordinator can estimate resources required for a storage application based on past instances of resources required. The cloud managed services coordinator can also estimate the amount of resources required by a type of resource required. In various embodiments, the resources required can be based on similar applications. For example, a storage application may have a virus scan that requires a certain number of CPU cycles per megabyte scanned. The cloud managed services coordinator can use the resource estimate for the storage application for a virus scan of a gaming application.

In operation 514, the cloud managed services coordinator can group the plurality of tasks into a set of tasks based on the resource type. In various embodiments, operation 514 is optional and can occur before operation 512. For example, the cloud managed services coordinator can group the task by resource type prior to determining the amount of resources required for the service.

The set of tasks can be created based on similar types of resource types. For example, the tasks can be grouped into sets that are processing-intensive or IO intensive. Creating sets of tasks based on like resources types can be advantageous when load balancing a cloud-computing network. However, a set created based on similar types of resources may be also unbalanced, meaning that one resource type is overused (i.e., used beyond what is available to the host) by one or more applications within a particular period of time.

The set of tasks can also be grouped based on dissimilar resources required by the host within the same set. The set of tasks that use dissimilar resources at the same time from two or more applications can be balanced, meaning that one resource type is not overused by two or more applications within a particular period of time. A balanced set results in the demand for a first resource being different than that of a second resource at points in time. A balanced set allows the parallel processing of different tasks for one or more applications. A set of tasks can include a first task with one processor intensive resource requirement, a second task with one IO intensive resource requirement, and third task with a bandwidth-intensive resource requirement. The remaining resource requirements in the first, second, and third tasks can be of a lower quantity compared with the intensive resource requirement. In various embodiments, when grouped into a set, the resource requirements can be normalized. By having a set of tasks with different intensities of resource requirements, a set of virtual machines running the particular applications can be balanced to ensure that a resource type is not overused by two applications on the host running at the same time.

In operation 516, the cloud managed services coordinator can determine whether a resource amount for a resource type is present in the computing environment. For example, a task in the set may require resources beyond those made available by a host at a given point in time (e.g., for parallel processing of tasks). For example, a first task and a second task may each require a large amount of processing (e.g., more than 90%), while a third task may require a large amount of IO bandwidth. The third task may be scheduled in parallel with either the first task or the second task but not both. Thus, when the resource amount is not present in the computing environment, the cloud managed services coordinator can determine the priority between the first task and the second task in operation 518.

In operation 518, the cloud managed services coordinator can determine a priority of a task within the set of tasks based on the resources required and one or more prioritization factors. In various embodiments, the priority may refer to an order in which the tasks are performed. In an unbalanced set requiring a large amount of a single resource type, the priority may be important because a single type of resource is consumed. By prioritizing the resource required, a cloud manager can avoid overcommitting the resource. Likewise, if the set of tasks is balanced, then the prioritization of tasks within the set may not be necessary. For example, if each task in the set requires a high amount of a different type of resource, then the tasks in the set can be run simultaneously and prioritization is unnecessary. Assuming that the set is unbalanced, if two or more tasks in the set require an amount of resources beyond what the host can provide, then the tasks may not be performed in parallel and may be prioritized. To determine priority, the cloud managed services coordinator may utilize various prioritization factors which are described further herein.

If there are more available resources than resources required by the computing environment at a given cycle, i.e., whether a resource dependency is sufficient within the hosting service, then the method 500A can continue to reference A.

Figure 5B:
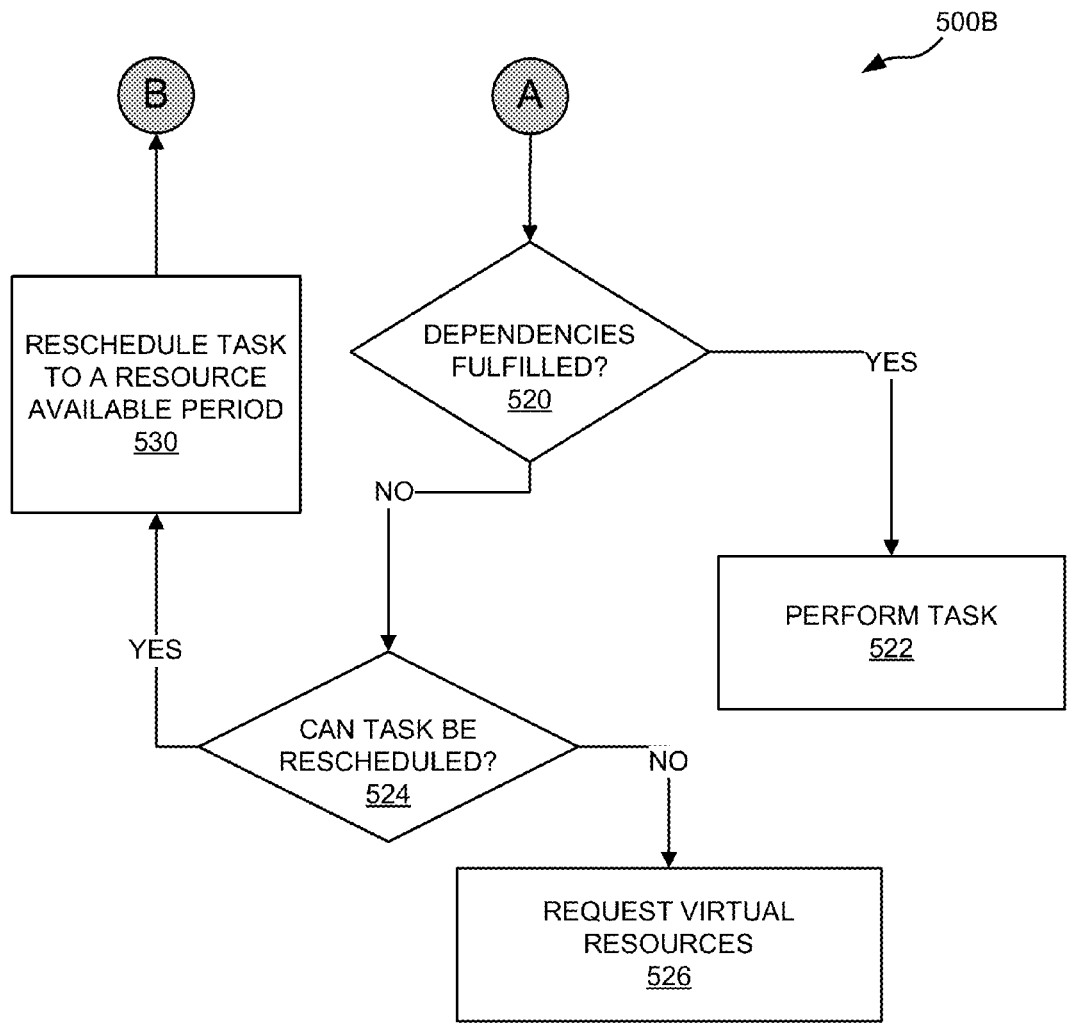
FIG. 5B illustrates a flowchart of a method 500B for rescheduling tasks, according to various embodiments.

FIG. 5B illustrates a flowchart of a method 500B for rescheduling tasks, according to various embodiments. The method 500B can continue from reference A in FIG. 5A.

In operation 520, the cloud managed services coordinator can determine whether the dependencies are fulfilled. A dependency is a condition that allows for the task to be performed when the condition is fulfilled. There may be several dependencies depending on the task (e.g., policy dependencies, relationship dependencies). In various embodiments, the resource availability for the tasks may be a form of dependency in operation 518 in FIG. 5A (e.g., a resource dependency). A dependency may be sufficient or fulfilled when one or more of the various conditions in the dependency are fulfilled. For example, in policy dependency, with four policy conditions related to scheduling of tasks, if three of the policy conditions are met, then the policy dependency may still be sufficient depending on user preferences. If four of the policy conditions are met, then the policy dependency may be met and the task may be run on the host.

The policy dependency may have one or more conditions involving policies or rules of a task. An example of a policy dependency would be if the task can occur within the hour of 2045 and 2145. The relationship dependency is a condition involving relationships with other tasks. An example of a relationship dependency would be if a first task cannot be performed at the same time as a second task and a third task. Various dependencies may interact with each other. For example, if a first task can only take place between the hours of 2045 and 2145 and a second task can only take place if a third task is performed with the second task, and the time is 2142, then the policy dependency would be sufficient.

In embodiments, the cloud managed services coordinator can determine whether a policy dependency is sufficient within the hosting service. Once the cloud managed services coordinator determines that the policy dependency is sufficient, then the cloud managed services coordinator can request a particular host from the hosting service that fulfills the policy dependency. For example, if a policy dependency calls for a task only from a secure host within the computing environment (e.g., a first host), then the cloud managed services coordinator can request the first host to fulfill the policy.

In a similar fashion, the cloud managed services coordinator can determine whether a relationship dependency is fulfilled within/by the hosting service. A relationship dependency may have one or more conditions that relate to the relationships between the various tasks in a temporal manner. If a relationship dependency is sufficient, or fulfilled within the hosting service, then the cloud managed services coordinator can request a particular host from the hosting service that fulfills the relationship dependency. For example, if the relationship dependency calls for a first task to occur when a second task occurs, and the second task occurs on a first host, then the cloud managed services coordinator can request the first task to occur on the first host to fulfil the relationship dependency. Once a dependency is fulfilled, then the method 500B can continue to operation 522.

In operation 522, the cloud managed services coordinator can perform, in response to the resource dependency being sufficient, the task in the set of schedule services as a function of the priority. For example, if the dependencies are fulfilled by the first task that has a higher priority than the second task, and the first task occurs in parallel with a third task, then the cloud managed services coordinator can perform the first task concurrently with the third task, followed by the second task. The delay between tasks may be user dependent or can fulfil a delay dependency.

In operation 524, the cloud managed services coordinator can determine whether a task can be rescheduled. If one or more dependencies are insufficient, then performing the task at the planned time or within a planned time range may not be feasible. For example, if a task has a range of times, and the dependencies are insufficient at a first time period, then performing the task at a second time period within the range of times may be more feasible. The cloud managed services coordinator can determine whether one or more tasks can be rescheduled by determining whether the task is able to be rescheduled to a different time. For example, a situation may exist where the task can only happen at a particular time and the permissions do not allow rescheduling. The rescheduling can also occur when adequate dependencies would be fulfilled at a rescheduled time. For example, if a task has sufficient dependencies at a second time but not a first time, then the task can be rescheduled to the second time. In embodiments, a user may be notified of a scheduling conflict and take appropriate action. A task can also be rescheduled when a task has permissions to change the scheduling. The rescheduling of the task to another time period can occur in response to determining whether the task can be rescheduled.

Assuming that the task can be rescheduled, the task can be rescheduled to a resource available period in operation 530. In operation 530, the cloud managed services coordinator can reschedule a task to a resource available period. The cloud managed services coordinator can determine, in response to the resource dependency being insufficient, whether the task can be rescheduled to a second period of time in operation 524. Assuming that the task can be rescheduled based on a resource available period being present, then the cloud managed services coordinator can reschedule the task in operation 530, responsive to the determining whether the task can be rescheduled in operation 524, to another period of time.

The resource available period can be marked by an availability of resource amounts of various resource types to accommodate a task. The resource available period can be based on a historical usage of the host. For example, if during a first time period, a host has 3 million CPU cycles per second and, during a second time period, a host has 4 million CPU cycles per second, then the resource available period can be the second time period. The resource available period may also depend on the resource type for the task. For example, a processing intensive task may not benefit from high memory availability.

In operation 526, the cloud managed services coordinator can request, in response to the resource dependency being insufficient, additional resources from the computing environment. For example, if the task cannot be rescheduled, then the cloud-computing environment may not be able to shift any of the tasks. The cloud managed services coordinator can request additional resources from the cloud-computing environment in order to perform the tasks. For example, if the cloud managed services coordinator detects a higher amount of tasks than virtual resources, then the cloud managed services coordinator can request to the cloud manager that the applications using the services will require more virtual resources.

Figure 6:
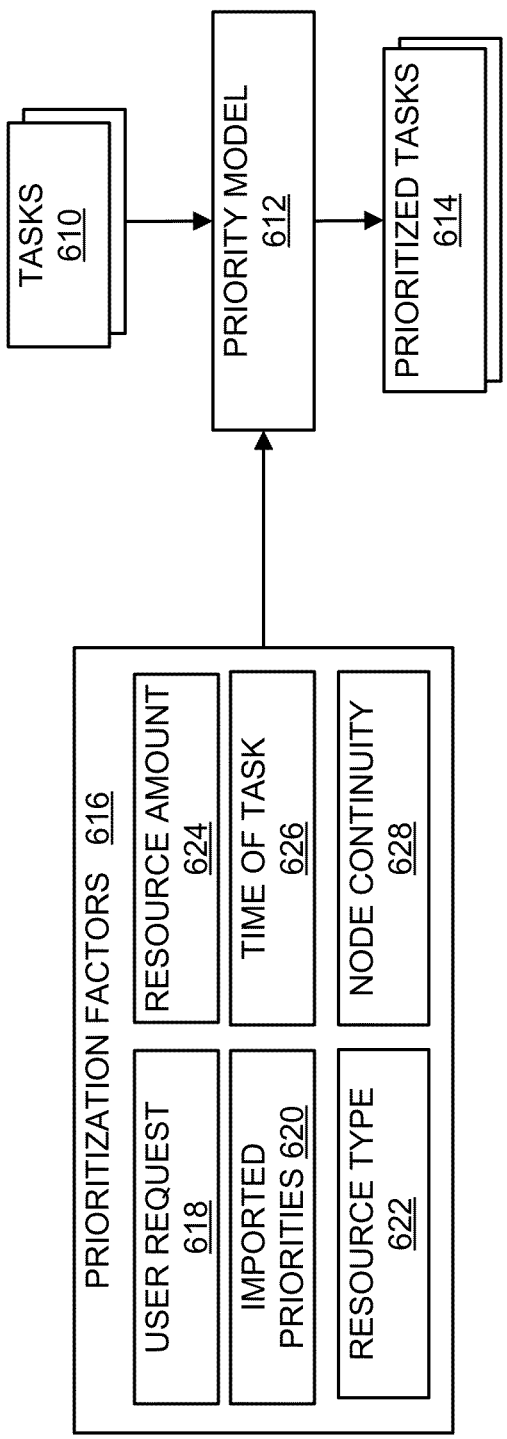
FIG. 6 illustrates a block diagram of the priority model and the one or more prioritization factors, according to various embodiments.

FIG. 6 illustrates a block diagram of the priority model 612 using one or more prioritization factors 616 to prioritize a plurality of tasks, according to various embodiments.

A plurality of tasks 610 can be prioritized using a priority model 612. The resulting prioritized tasks 614 can then be used by a host to determine when to perform the prioritized task. Various prioritization factors 616 may be used by the priority model 612. Resources, policy, and relationship can affect the priority model 612. For example, when approaching the end-of-month processing, the priority of tasks may be generally decreased so that a task does not steal CPU processing needed for end-of-month processing, or similarly, during mid-month, CPU processing intensive tasks may be increased in order to get completed before end of month.

If a scarce resource type is needed, then priority for a task must be high to utilize this resource. If a priority is not high enough, then the priority may be slowly increased over time by a cloud managed services coordinator so the task is not starved of resources. Eventually, the task gets a high enough priority to use the scarce resource.

The prioritization factors 616 may include and be selected from the group of a user request factor 618, an imported priority factor 620, a resource type factor 622, a resource amount factor 624, a time factor 626, or a node continuity factor 628.

A user request factor 618 may be present when a user or administrator requests that a task receive a higher priority. For example, a patch update for an application may be deemed urgent by an administrator so the priority may be increased in order for the fixes to have a higher priority than other scheduled tasks and other fixes.

The prioritization factors 616 may also include imported priority factor 620. Imported priorities may occur when a task was important in a different context. For example, a patch update task can receive priority based on a security vulnerability found in an application which can be carried forward in a constrained resource context.

The resource type factor 622 and resource amounts factor 624 may be present based on the demand of a resource type by a task relative to the resources. For example, a virus scan task may require a certain amount of processing resources. If the computing environment has an abundance of processing resources, then the virus scan task may be prioritized. Various balancing may occur depending on the other resource types. For example, if the virus scan task had sufficient processing resources and another task has insufficient IO resources, then the virus scan task can be prioritized.

The time factor 626 may exist when a task is preferred during a particular time period. For example, a virus scan task may not be preferred during hours from 0900-1600 but may be preferred during hours from 0200-0300. If the task is scheduled for 0215, then the time factor 626 may be influential to the priority model.

The node continuity factor 628 may give a factor that uses resources found on a single node a higher priority. For example, if a first task utilizes a first resource from a first node and a first resource from a second node, but a second task utilizes a first resource from only the first node, then the priority model 612 may prioritize the second task. Node continuity may be important to reduce requests for resources between nodes which can further reduce the network traffic.

Figure 7A:
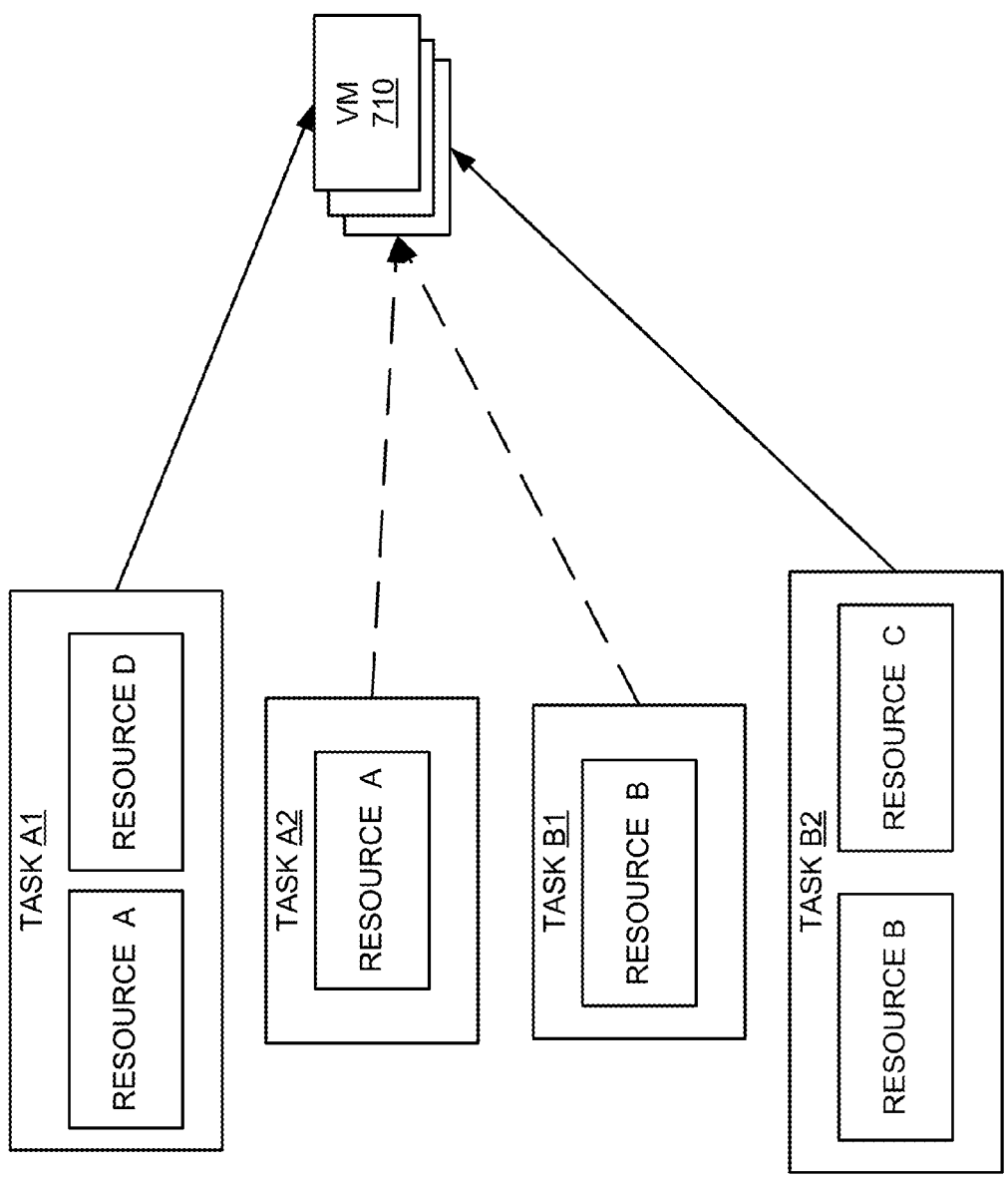
FIG. 7A illustrates a resource conflict between various tasks for a virtual machine, according to various embodiments.

FIG. 7A illustrates a resource conflict between various tasks for a virtual machine, according to various embodiments. For example, a plurality of virtual machines 710 may be assigned a plurality of tasks each requiring different resources. For example, task A1 and task A2 may be tasks of an application A such as a virus scan task and a patch update task. Task A1 may use resource A, and resource D. Task A2 may use resource A. Task B1 and B2 may be tasks of application B such as backup tasks or fix apply tasks. Task B1 may use resource B, while task B2 may use resources B and C. The VMs 710 may be configured to have the tasks (A1 through B2) scheduled during the same time period. The tasks A2 and B1 may not be able to be performed due to a resource conflict with task A1 and B2, respectively.

Figure 7B:
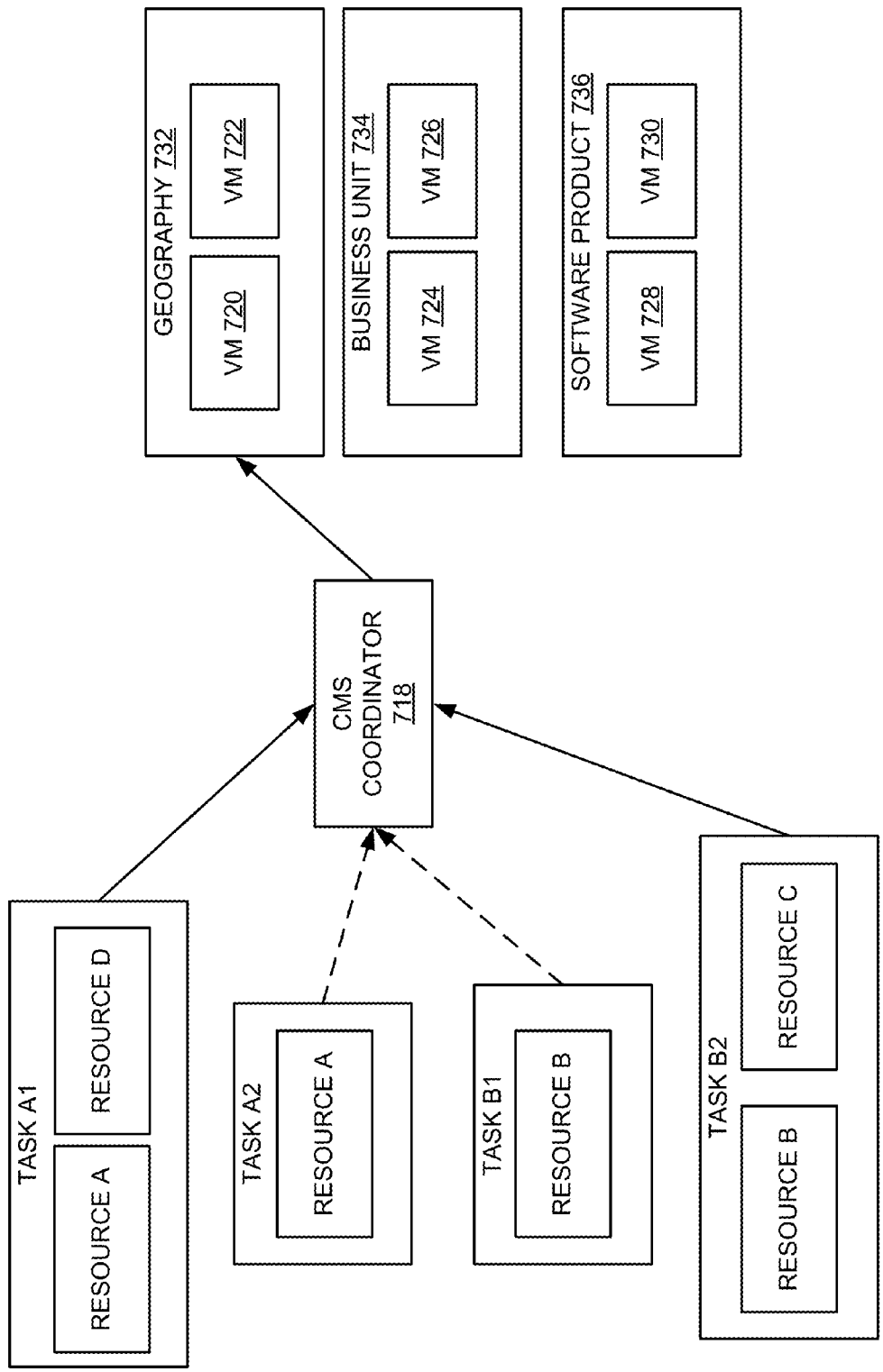
FIG. 7B illustrates the grouping of various virtual machines and tasks according to resources required, according to various embodiments.

FIG. 7B illustrates the grouping of various virtual machines into sets and scheduling tasks according to resources required, according to various embodiments. Aspects of the present disclosure may be focused on a set of tasks that a set of VMs may have as opposed to the tasks a particular VM may have. The set of tasks that a set of VMs may have may be differentiated from the task that a particular VM has in that each task in the set of tasks may have conflicting resource requirements with other tasks in the set, and the set of VMs is normally too large to process all tasks at one time. The cloud managed services coordinator 718 may be needed to schedule and allocate the various tasks to the various VMs.

Frequently, the set of VMs need to be subsetted into smaller sets based on a VM characteristic (e.g., based on geography, business unit, software products, etc.). Similarly, the set of tasks may be subsetted by like tasks (virus scan tasks, backup tasks, fix apply tasks, etc). Each smaller set of tasks for VMs may be scheduled for a time or resource to apply one of the subset tasks in the set of tasks. The cloud managed services coordinator 718 can avoid conflicting tasks that are processed at the same time by the same resources. For example, two CPU-intensive tasks may not be sent to the same pool for a set of VMs, but a CPU-intensive task and an IO intensive task may be sent to the same pool for the same set of VMs. Scheduling of tasks may account for resources, priority of tasks, and priority of sets of VM users. For example, the schedule may avoid applying fixes and rebooting during the work day to a large set of users.

In various embodiments, the cloud managed services coordinator 718 can group a plurality of VMs into smaller sets of VMs. In FIG. 7B, the VMs can be grouped into a geography set 732, a business unit set 734, and a software product set 736. For example, the geography set 732 can have VM 720 and VM 722. The business unit set 734 can have VM 724 and VM 726. The software product set 736 can have VM 728 and VM 730. The various sets can indicate VMs with similar properties. For example, VM 720 and VM 722 can have a similar geographical location. The tasks A1-B2 can be applied to the set of VMs as described herein.

Figure 7C:
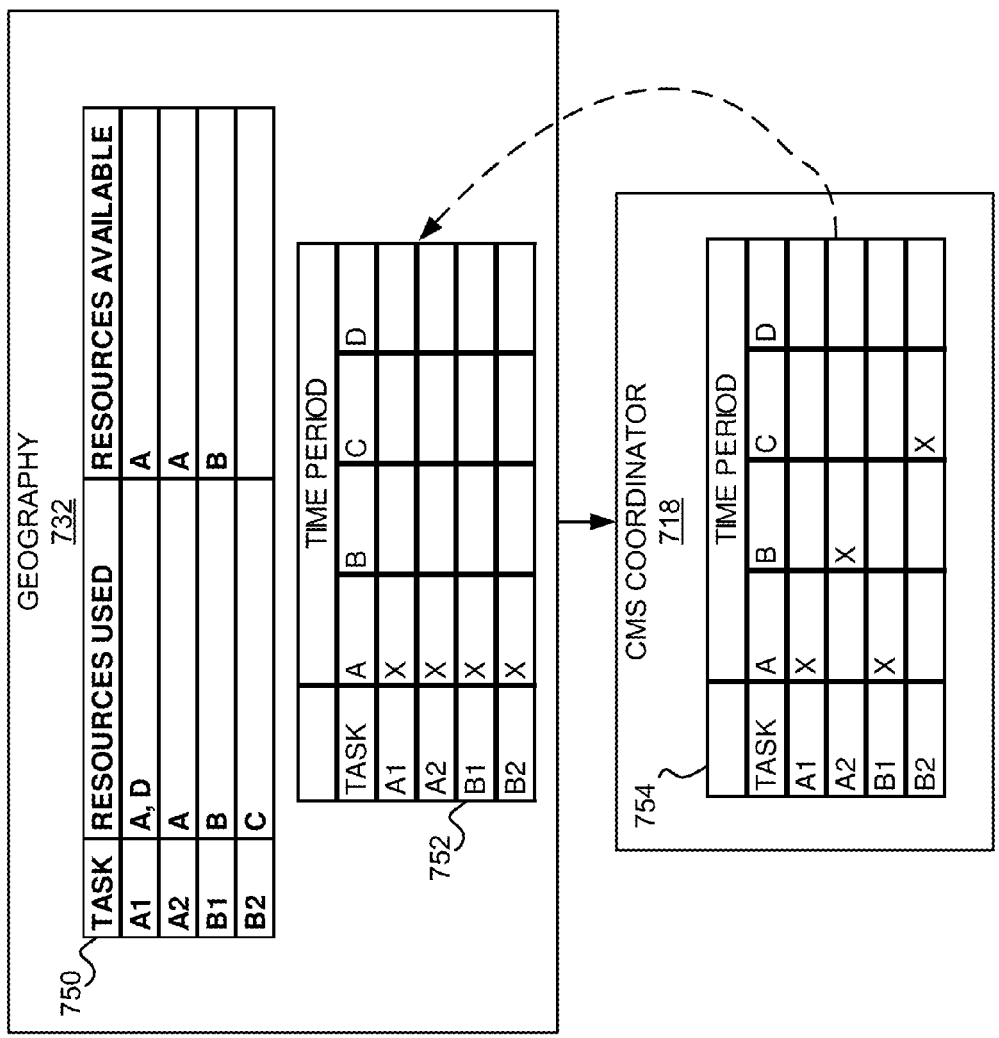
FIG. 7C illustrates the scheduling of tasks within the geography set of VMs, according to various embodiments.

FIG. 7C illustrates the scheduling of tasks within the geography set 732 of VMs, according to various embodiments. As mentioned, the geography set 732 can have VM 720 and VM 722. The set of tasks may be an abstract grouping into a pool. The cloud managed services coordinator 718 can evaluate the tasks and the resources used by the task at a particular time period, e.g., as illustrated table 750, and compare the resources used with the resources available to perform the task. As shown in table 750, the resources available to the geography set 732 are resources A and B. For example, the pool may have resource A available within the pool for task A1 and resource A available for task A2. The pool may also have resource B for task B1 but not for task B2. An initial schedule of tasks is found on table 752. For example, the tasks A1-B2 can be conflicting because both task A1 and task A2 are competing for the resource A.

The cloud managed services coordinator 718 can recommend a rescheduling of the initial schedule shown in table 752. For example, the cloud managed services coordinator 718 can create a new schedule shown in table 754. Since task A1 and task A2 are in competition for resource A, then the priority model of the cloud managed services coordinator 718 can come into play. For example, task A1 may be determined to have a higher priority due to the importance of the task as determined by an admin. Therefore, task A1 may be scheduled before task A2 at time period A. Since task B1 does not use the same resources as task A1, then task A1 can be scheduled concurrently with task B1 at time period A. Since task B1 and task B2 both use resource B (and if resource B is insufficient for both task B1 and task B2), then task B2 would have a lower priority than task B1 (since the pool does not have the resource B to support task B2 and may have to request the resource from another host). The task B2 may be scheduled at time period C in order to accommodate the delay of requesting resources from another host.

Referring to FIG. 4, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for applying tasks, comprising:
a processor; and
a memory storing a program, which, when executed on the processor, performs an operation comprising:
receiving a plurality of tasks for a plurality of applications, the plurality of tasks including a first task and a second task, an application of the plurality of applications being hosted by a computing environment utilizing a monitoring agent, and a task being performed for an operation of the application during a first period of time;
determining, prior to processing the task, a first resource type and a first resource amount from the computing environment for performing the task;
grouping the plurality of tasks into a set of tasks based on the first resource type, at least two tasks from the set of tasks being performable in parallel during the first period of time, wherein grouping the plurality of tasks comprises:
determining a first resource requirement of the first task and a second resource requirement of the second task; and
grouping the first task and the second task into a first group based on the first resource requirement and the second resource requirement
determining whether the first resource amount of the first resource type is present in the computing environment during the first period of time;
determining, in response to the first resource amount of the first resource type not being present in the computing environment and prior to processing the task, a priority of computing environment and one or more prioritization factors;
performing the task in the set of tasks as a function of the priority;
determining that the first task and a third task require a same resource;
determining that the first task has a first priority, and the third task has a second priority;
processing the first group at a first time, wherein the processing the first group includes processing the first task and the second task in parallel; and
processing the third task at a second time, the second time being after the first time.

2. The system of claim 1, wherein the one or more prioritization factors is selected from:
a user request, an imported priority, a resource type, a resource amount, a time of the task, and node continuity.

3. The system of claim 1, wherein the operation performed further comprises:
determining, in response to the resource dependency being insufficient, whether the task can be rescheduled to a second period of time; and
rescheduling the task, responsive to the determining whether the task can be rescheduled, to the second period of time.

4. A system for applying tasks, comprising:
a processor; and
a memory storing a program, which, when executed on the processor, performs an operation comprising:
receiving a plurality of tasks for a plurality of applications, an application of the plurality of applications being hosted by a cloud computing environment utilizing a monitoring agent, and a task being performed on a first virtual machine for an operation of the application during a first period of time;
determining, prior to processing the task, a first resource type and a first resource amount from the computing environment for performing the task;
grouping the plurality of tasks into a set of tasks based on the first resource type, at least two tasks from the set of tasks being performable in parallel during the first period of time;
determining whether the first resource amount of the first resource type is present in the computing environment during the first period of time;
determining, in response to the first resource amount of the first resource type not being present in the computing environment and prior to processing the task, a priority of computing environment and one or more prioritization factors; and
performing the task in the set of tasks as a function of the priority;
determining whether a resource dependency is sufficient within the computing environment; and
requesting, in response to the resource dependency being insufficient, additional resources beyond the first resource amount from the computing environment, requesting additional resources comprising:
determining that the first virtual machine and a second virtual machine are operating on a host of the computing environment; and
allocating a first resource from the second virtual machine to the first virtual machine in response to the first virtual machine not having adequate resources to process the task.

5. The system of claim 4, wherein the operation performed further comprises:
determining whether a particular task of the plurality of tasks fulfills a policy dependency for a particular host within the computing environment; and
requesting, in response to the particular task fulfilling the policy dependency, the particular host from the computing environment that fulfills the policy dependency for the task of the plurality of tasks.

6. The system of claim 4, wherein the operation performed further comprises:
   determining whether a particular task of the plurality of tasks fulfills a relationship dependency within the computing environment; and
   requesting, in response to the particular task fulfilling the relationship dependency, a particular host from the computing environment that fulfills the relationship dependency for the task of the plurality of tasks.

7. A computer program product for applying tasks comprising a computer readable storage medium having a computer readable program stored therein, wherein the computer readable program, when executed on a computing device, causes the computing device to:
   receive a plurality of tasks for a plurality of applications, the plurality of tasks including a first task and a second task, an application of the plurality of applications is hosted by a computing environment utilizing a monitoring agent, and a task is performed for an operation of the application during a first period of time;
   determine, prior to processing the task, a first resource type and a first resource amount from the computing environment for performing the task;
   group the plurality of tasks into a set of tasks based on the first resource type, at least two tasks from the set of tasks being performable in parallel during the first period of time, wherein grouping the plurality of tasks comprising:
      determining a first resource requirement of the first task and a second resource requirement of a second task; and
      grouping the first task and the second task into a first group based on the first resource requirement and the second resource requirement
   determine whether the first resource amount of the first resource type is present in the computing environment during the first period of time;
   determine, in response to the first resource amount of the first resource type not being present in the computing environment and prior to processing the task, a priority of a task in the set of tasks based on both a second resource amount present in the computing environment and one or more prioritization factors;
   perform the task in the set of tasks as a function of the priority;
   determine that the first task and a third task require a same resource;
   determine that the first task has a first priority, and the third task has a second priority;
   process the first group at a first time, wherein processing the first group includes processing the first task and the second task in parallel; and
   process the third task upon completing processing of the first group.

8. The computer program product of claim 7, wherein the computing environment is a cloud computing environment.

9. The computer program product of claim 8, wherein the computer readable program further causes the computing device to:
   determine whether a particular task of the plurality of tasks fulfills a policy dependency for a particular host within the computing environment; and
   request, in response to the particular task fulfilling the policy dependency, the particular host from the computing environment that fulfills the policy dependency for the task of the plurality of tasks.

10. The computer program product of claim 8, wherein the computer readable program further causes the computing device to:
   determine whether a particular task of the plurality of tasks fulfills a relationship dependency within the computing environment; and
   request, in response to the particular task fulfilling the relationship dependency, a particular host from the computing environment that fulfills the relationship dependency for the task of the plurality of tasks.

11. The computer program product of claim 8, wherein the computer readable program further causes the computing device to:
   determine whether a resource dependency is sufficient within the computing environment; and
   request, in response to the resource dependency being insufficient, additional resources beyond the first resource amount from the computing environment.

12. The computer program product of claim 7, wherein the one or more prioritization factors is selected from:
   a user request, an imported priority, a resource type, a resource amount, a time of the task, and node continuity.

13. The computer program product of claim 7, wherein the computer readable program further causes the computing device to:
   determine whether a resource dependency is sufficient within the computing environment; and
   request, in response to the resource dependency being insufficient, additional resources beyond the first resource amount from the computing environment.

14. The computer program product of claim 13, wherein the task is processed on a first virtual machine, and wherein requesting additional resources comprises:
   determining that the first virtual machine and a second virtual machine are operating on a host of the computing environment; and
   allocating a first resource from the second virtual machine to the first virtual machine in response to the first virtual machine not having adequate resources to process the task.

* * * * *